United States Patent [19]
Alfredsson

[11] Patent Number: 5,457,798
[45] Date of Patent: Oct. 10, 1995

[54] METHOD AND COMPUTER SYSTEM FOR INCREASING THE FUNCTIONALITY OF A COMPUTER PROGRAM

[75] Inventor: Christer Alfredsson, Gallstrandsvägen, Sweden

[73] Assignee: ICL Systems AB, Kista, Sweden

[21] Appl. No.: 142,879

[22] Filed: Oct. 25, 1993

[51] Int. Cl.⁶ .................................................. G06F 15/00
[52] U.S. Cl. ................. 395/700; 395/650; 364/280; 364/281.3; 364/286; 364/286.1; 364/286.2; 364/DIG. 1
[58] Field of Search .......................... 395/700; 364/280, 364/281.3, 286, 286.1, 286.2

[56] References Cited

U.S. PATENT DOCUMENTS

| | | | |
|---|---|---|---|
| 3,653,073 | 3/1972 | Carpenter et al. | 444/1 |
| 4,882,674 | 11/1989 | Quint et al. | 364/200 |
| 5,036,484 | 7/1991 | McCoy et al. | 364/900 |
| 5,204,956 | 4/1993 | Danuser et al. | 395/575 |
| 5,233,611 | 8/1993 | Triantafyllos et al. | 371/16.1 |
| 5,237,691 | 8/1993 | Robinson et al. | 395/700 |
| 5,301,326 | 4/1994 | Linnet et al. | 395/700 |
| 5,325,361 | 6/1994 | Lederer et al. | 370/94.1 |

OTHER PUBLICATIONS

"Standard Method for Running Applications from Unix Workstations", IBM Technical Disclosure Bulletin, vol. 34, No. 5, Oct. 1991, pp. 177–178.
PC Dynamics; Menu Works 2.10; several screen prints; 1989.
Employees of PC Dynamics; Menu Works (users guide); 1988 Aug.

*Primary Examiner*—Kevin A. Kriess
*Assistant Examiner*—Jonathan Hall Backenstose
*Attorney, Agent, or Firm*—Lee, Mann, Smith, McWilliams, Sweeney & Ohlson

[57] ABSTRACT

In a method for increasing the functionality of a computer program, use is made of a computer system comprising a user/terminal which via driver modules is connectible to a computer program. When the user/terminal requests execution of the computer program, the user/terminal is connected intially to a wrapper program via an additional driver module. After data exchange between the wrapper program and the user/terminal, the computer program is started from the wrapper program. Finally, the wrapper program is disconnected, and the computer program is connected to the user/terminal.

8 Claims, 2 Drawing Sheets

METHOD AND COMPUTER SYSTEM FOR INCREASING THE FUNCTIONALITY OF A COMPUTER PROGRAM

BACKGROUND TO THE INVENTION

The present invention relates to a method for increasing the functionality of a computer program, and a computer system for carrying out this method.

The invention relates more specifically to a method for increasing the functionality of a computer program which in a computer system is requested to be executed by a user via the driver, the user being connected to a wrapper program via the driver when the user requests execution of the computer program, for data exchange between the user and the wrapper program.

The invention is specifically directed to computer systems using a UNIX-type operating system. In such a system, the drivers are divided into different levels or modularised.

An example of increased functionality is improved security in respect of unauthorised utilisation of the computer system.

SUMMARY OF THE INVENTION

According to one aspect of the present invention there is provided a method for increasing the functionality of a computer program which in a computer system is requested to be executed by a user via a driver, the user being connected to a wrapper program via the driver, when the user requests execution of the computer program, for data exchange between the user and the wrapper program, and including the steps of (a) providing a supplementary driver, (b) starting the computer program by means of the wrapper program via the supplementary driver, (c) partially executing the computer program by means of the wrapper program on the basis at least partly of data supplied to the wrapper program during the data exchange with the user, and (d) subsequently initiating, by means of the wrapper program via the supplementary driver, disconnection of the wrapper program from and connection of the user to the computer program.

According to another aspect of the present invention there is provided a computer system comprising a user, a computer program and driver modules via which the user is connectible to the computer system, wherein (a) an additional driver module is arranged adjacent the computer program (b) a wrapper program is arranged to be connected, by means of the additional driver module, to the user when the user requests execution of the computer program, and (c) the additional driver module is adapted to connect, after connection of the wrapper program and data exchange with the user, the computer program to the wrapper program for start and partial execution of the computer program, and subsequently to disconnect the wrapper program and to connect the user to the computer program.

Thus, the computer program is started and executed to a desired step from the wrapper program on the basis at least partly of data supplied to the wrapper program from the user.

The supplementary driver, which the additional driver module constitutes, preferably comprises a switching function in the driver part adjacent the computer program and the wrapper program. This switching function implies that the computer program, during start and execution thereof up to the desired step, is connected to the wrapper program only, which then emulates the user.

The disconnection of the wrapper program is suitably carried out by the supplementary driver, requested from the wrapper program, and the connection of the computer program to the user is then effected with such a delay as to avoid any loss of data.

The invention has been developed on the basis of a computer system operating with the operating system UNIX, and the invention is especially applicable to such a system.

For example, the wrapper program and the computer program may be log-on programs, and the wrapper program may have extended security functions in relation to the computer program.

BRIEF DESCRIPTION OF THE DRAWINGS

The invention will now be described in more detail with reference to the accompanying drawings, in which.

DESCRIPTION OF THE PREFERRED EMBODIMENTS

Figure 1:
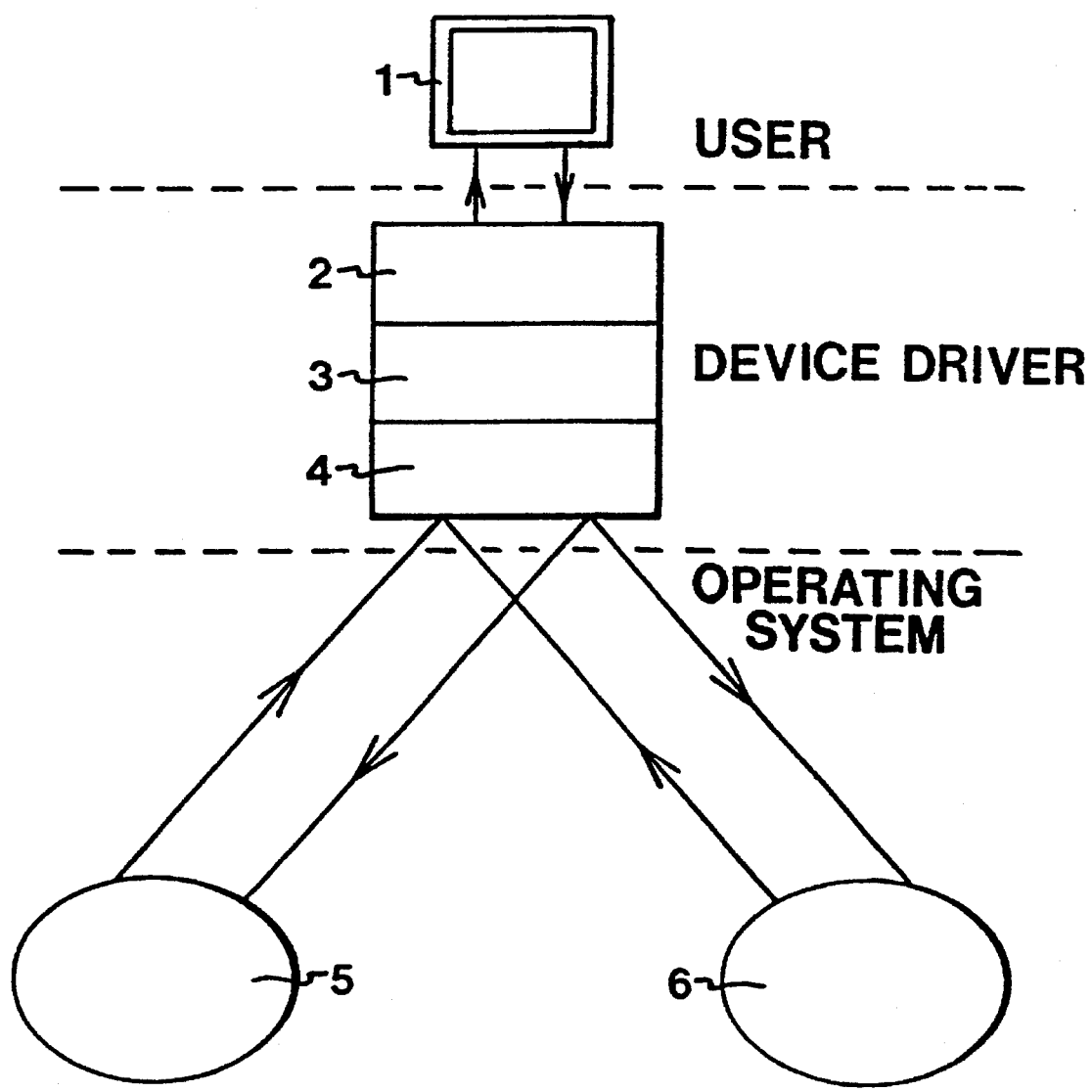
FIG. 1 is a schematic view of a part which is included in a computer system having the operating system SVR4 UNIX, and which is of immediate interest to the invention.

The subsystem of a computer system, as shown in FIG. 1, comprises on the user level a terminal 1 or the like, on the driver level a plurality of driver modules 2, 3 and 4, and the operating system and program level an original program 5 and a wrapper program 6. Except for the driver module 4 and the wrapper program 6, this is a conventional UNIX environment in the operating system SVR4.

Figure 2A:
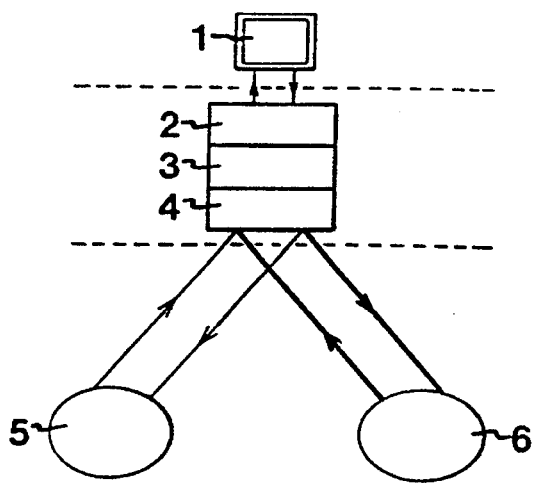
FIGS. 2a–c illustrate the mode of operation of the subsystem in three steps.
Figure 2B:
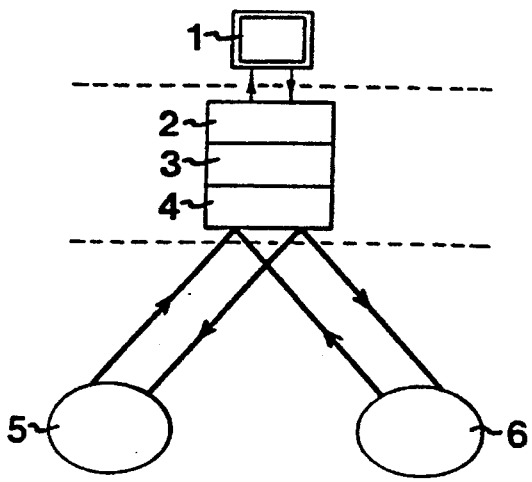
Figure 2C:
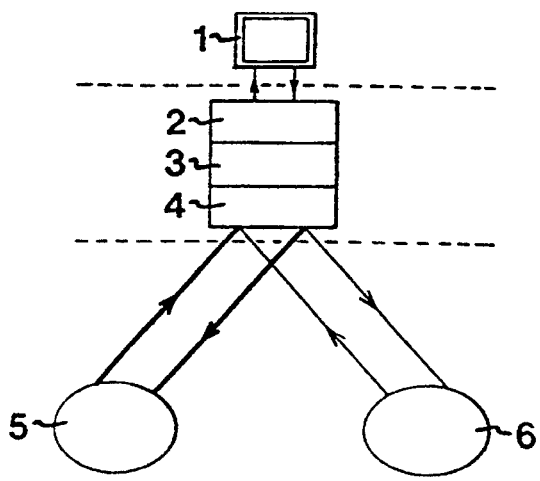

The mode of operation of the computer system in FIG. 1 is illustrated in FIGS. 2a–c.

When a user directly or indirectly request, via the terminal 1, execution of the original program 5, the driver module 4 which constitutes a switching module controlled by an input-output control function (IOCTL) will, as shown in FIG. 2a, connect the terminal to the wrapper program 6, which implements an increased functionality, eg extended security functions in respect of access to the computer system in relation to the security functions which are to be found in the original program 5.

During data exchange with the user/terminal 1, the wrapper program 6 now performs the particular increase functions, and when these have been performed in a satisfactory manner, the wrapper program 6 requests the switching module 4 to connect the wrapper program 6 to the original program 5, as illustrated in FIG. 2b. Subsequently, the wrapper program 6 emulates the user/terminal 1 and accomplishes start of the original program 5. The wrapper program 6 continues the execution of the original program 5 to a predetermined step thereof, for example while utilising data which the wrapper program 6 has initially received from the user/terminal 1.

When the wrapper program 6 has reached the desired step in the original program, it should transfer the execution of the original program 5. This takes place by the wrapper program 6 requesting the switching module 4 to establish a signal path between the original program 5 and the user/terminal 1, as illustrated in FIG. 2c. It is essential that no data are lost in the switching, which can be achieved by delaying the switching sufficiently to make it possible for the original program 5 to safely receive the last messaage from the wrapper program 6, but not longer than to allow the next message from the original program 5 to the user to be connected to the terminal 1. The wrapper program 6 can now remove the driver module 4 and then terminate itself. The execution of the original program now continues as if the driver module 4 and the wrapper program 6 do not exist.

When the execution of the original program 5 is completed, the return to the starting position takes place, as illustrated in FIG. 2a.

It will be appreciated that the present invention makes it possible to achieve a modification of the behaviour of the original program, ie an increased functionality, by means of the switching module 4 and the wrapper program 6, without access to the source code of the original program 5, which is of essential importance.

Of course, the invention also results in a considerable simplification in case the original program 5 is changed. It may be necessary to change the wrapper program 6, but these changes do not necessarily affect the user/terminal 1. The invention thus permits data exchange between two non-related processes via normal file descriptors which suitably are common to the original program 5 and the wrapper program 6.

The increased functionality resulting from the invention is highly valuable for example in the case where the original program 5 and the wrapper program 6 are log-on programs, since the wrapper program 6 may then introduce essentially extended security functions, without the security functions included in the original program 5 having to be affected or changed. For example, after the data exchange with the wrapper program, the user cannot affect the partial execution of the computer program, which is carried out by the wrapper program.

What is claimed is:

1. A computer-implemented method for increasing effective functionality of a computer program which in a computer system is requested to be executed by a user via a driver means, the computer system including a wrapper program which provides functions not found in the computer program, the wrapper program being connectable to the user or to the computer program via a supplementary driver of the driver means, the user being connected to the wrapper program via the supplementary driver when the user requests execution of the computer program, the method being performed by the computer system when executing the wrapper program and including the steps of:

(a) interfacing with the user via the supplementary driver, said interfacing comprising data exchange between the user and the wrapper program where the wrapper program acts to collect data to be at least partly used to generate input to said computer program, (b) performing said functions not found in the computer program during the data exchange with the user, (c) starting the computer program via the supplementary driver, (d) partially executing the computer program employing the data supplied to the wrapper program during the data exchange with the user, and (e) subsequently initiating, via the supplementary driver, disconnection of the wrapper program from the computer program and connection of the user to the computer program via the supplementary driver for continued execution of the computer program.

2. A method as claimed in claim 1, wherein the computer program, during start and partial execution thereof, is connected to the wrapper program only.

3. A method as claimed in claim 1 wherein the supplementary driver is supplied with a switching function in its part adjacent the computer program and the wrapper program.

4. A method as claimed in claim 1, wherein the disconnection of the wrapper program is carried out by the supplementary driver, as requested from the wrapper program, and the connection of the computer program to the user is then effected with such a delay as to avoid any loss of data.

5. A computer system comprising a user, a computer program, and driver modules, wherein one of the driver modules serves to connect the user to a wrapper program and to connect the user to the computer program, said system comprising:

(a) a computer comprising:
  (i) a CPU,
  (ii) memory,
  (iii) means for interfacing to allow data exchange between the user and the computer, and (b) supplemental driver means comprising:
  (i) interface means to serve as an interface between one of the following at any given time: the user and the wrapper program, the wrapper program and the computer program, or the user and the computer program,
  (ii) control means operative upon the interface means to deestablish the connection between the wrapper program and the computer program and to establish the connection of the user to the computer program, and (c) wrapper operating means comprising:
  (i) data collecting means to collect data from the user during data exchange via said supplemental driver means
  (ii) startup means to start execution of the computer program via the supplemental driver means and to continue execution of the computer program by employing data obtained from the user during said data exchange, and
  (iii) transfer means operative to terminate, via the supplemental driver means, the wrapper program and to connect the user to the computer program via the supplemental driver means.

6. A computer system as claimed in claim 5 and which is a UNIX-based system.

7. A computer system as claimed in claim 5, wherein the wrapper program and the computer program are log-on programs, and the wrapper program has extended security functions in relation to the computer program.

8. Computer system as claimed in claim 5, wherein the wrapper program and the computer program have the same file descriptors.

* * * * *